Figure 1:
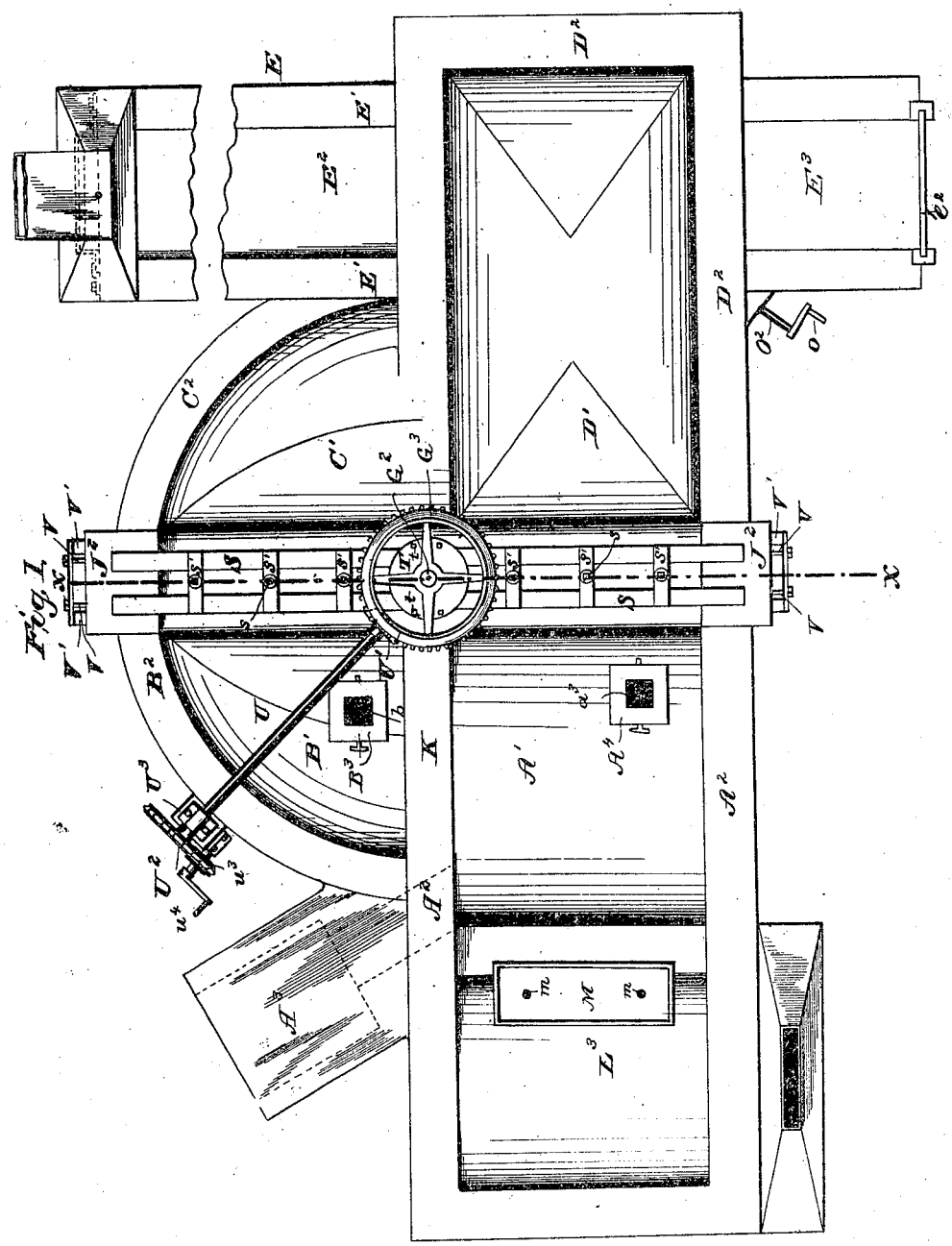

(No Model.) 6 Sheets—Sheet 1.

T. A. ZELLERS.
FLATTING AND ANNEALING OVEN FOR GLASS.

No. 298,332. Patented May 6, 1884.

(No Model.) 6 Sheets—Sheet 2

T. A. ZELLERS.
FLATTING AND ANNEALING OVEN FOR GLASS.

No. 298,332. Patented May 6, 1884.

WITNESSES— INVENTOR—

(No Model.) 6 Sheets—Sheet 3.

T. A. ZELLERS.
FLATTING AND ANNEALING OVEN FOR GLASS.

No. 298,332. Patented May 6, 1884.

WITNESSES
INVENTOR (No Model.)

6 Sheets—Sheet 5.

T. A. ZELLERS.
FLATTING AND ANNEALING OVEN FOR GLASS.

No. 298,332. Patented May 6, 1884.

(No Model.)
T. A. ZELLERS.
FLATTING AND ANNEALING OVEN FOR GLASS.
No. 298,332. Patented May 6, 1884.
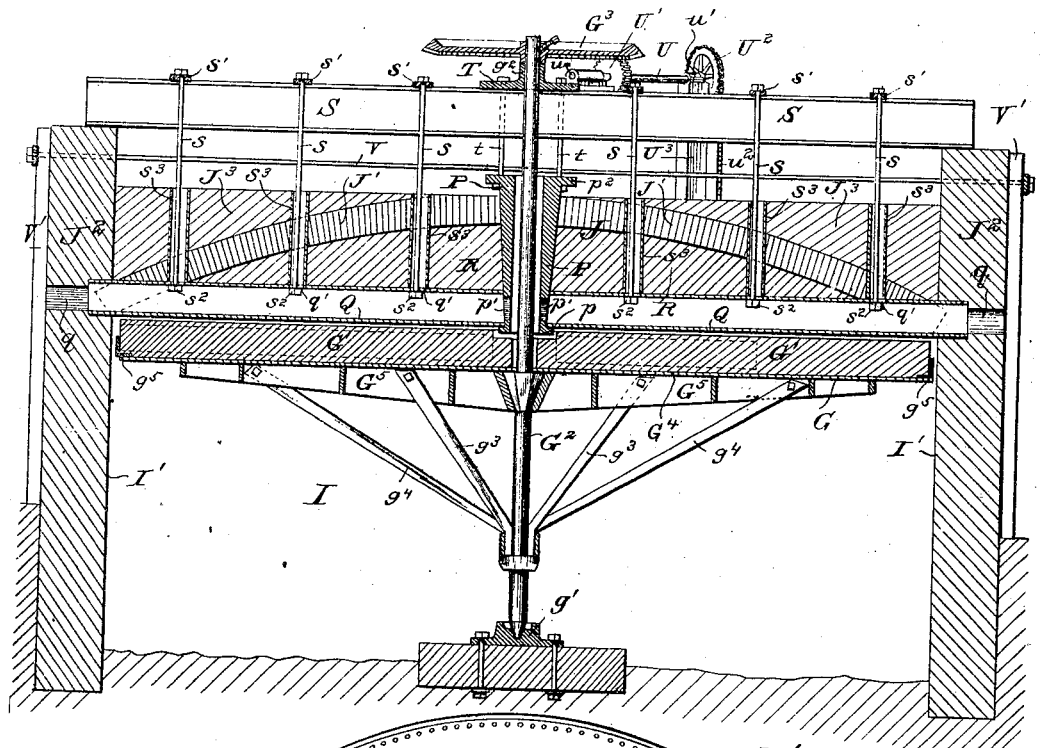
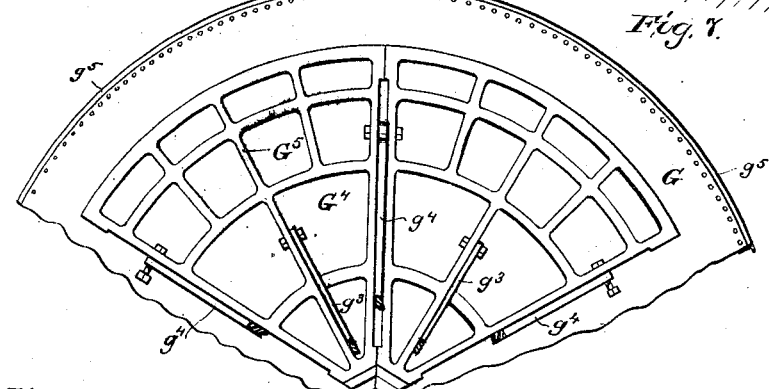
WITNESSES
F. U. Adams
Jno. W. Stockett
INVENTOR
Theodor A. Zellers
per M. E. Dayton
Attorney

UNITED STATES PATENT OFFICE.

THEODOR A. ZELLERS, OF OTTAWA, ILLINOIS, ASSIGNOR TO THE OTTAWA GLASS COMPANY, OF SAME PLACE.

FLATTING AND ANNEALING OVEN FOR GLASS.

SPECIFICATION forming part of Letters Patent No. 298,332, dated May 6, 1884.

Application filed December 7, 1883. (No model.)

*To all whom it may concern:*

Be it known that I, THEODOR A. ZELLERS, of Ottawa, in the county of La Salle and State of Illinois, have invented certain new and useful Improvements in Flatting and Annealing Ovens for Glass; and I do hereby declare that the following is a full, clear, and exact description thereof, reference being had to the accompanying drawings, and to the letters of reference marked thereon, which form a part of this specification.

This invention relates to that portion of the operation of manufacturing window-glass in which a cylinder of glass previously blown and split is opened out so as to make a flat sheet. It relates more particularly to improvements in the construction of the oven and devices therein for handling the material during the heating of the glass cylinders and the cooling of the flat sheets; and it consists in the matters hereinafter described, and pointed out in the claims.

In the ovens heretofore used for heating glass cylinders for the purpose above stated, the previously blown and split cylinder is introduced into a heating-chamber and subjected either to the direct heat of the flames of wood or coal burned in a furnace adjacent to or forming part of such chamber, or it has been heated by gas, which is burned in the heating-chamber and directly over or in contact with the glass. For considerations of economy the use of coal is preferred to that of wood for the purpose mentioned, and when coal is used it is preferably first converted into gas and burned in that form, the latter method being the preferred one, for the reason that the glass may be thereby much more evenly and regularly heated than by the direct action of flame, the gas being made in a suitable generator near the oven and introduced into the heating-chamber thereof while still hot, so that it will burn around and over the surface of the glass by admitting a sufficient quantity of air to the chamber to cause combustion. In the use of gas made from coal of the kind ordinarily obtainable for the purpose, it has been found, however, that the sulphur or other components of the gas produced from such coal is liable to cause an injurious effect upon the product, the glass heated by the burning of such gas being found to have a superficial discoloration, usually presenting the appearance of a milky or whitish film, which cannot be permanently removed by any known process. I have found that the presence of a small quantity of steam in the gas produced from coal, as above mentioned, has the effect of preventing the discoloration caused by the sulphur contained in the gas; and in order to avoid the injurious effect of said sulphur upon the product I introduce a small quantity of water or steam into the gas-chamber of the generator, so that the gas, before it is introduced into the flatting-oven, contains or is thoroughly mixed with a quantity of steam. In the devices preferably used for introducing steam into the gas, means are provided for feeding water in small quantities to a receptacle in the gas-chamber of the generator. Such water, being vaporized by the heat in such chamber, and mingling with the gas therein, presumably in the form of superheated steam, is carried therewith to the oven of the flatting-furnace.

As relating to the means for handling the glass during the operation of flatting the previously-formed cylinders, the invention relates to that class of flatting-ovens having a heating-chamber, a cooling-chamber, and a revolving wheel or table which supports a series of flatting-stones and forms the bottoms of the chambers mentioned, the said table being constructed to turn so as to carry the flatting-stones successively from the heating to the cooling chamber, whereby the sheets of glass, after having been softened and flattened out upon the stones in the heating-chamber, may be carried to the cooling-chamber and therein allowed to become sufficiently hard to permit their removal from the said stones, the said oven being used in connection with an annealing-oven constructed to hold a number of trucks or cars, upon which the sheets of glass are placed after being removed from the flatting-stones, and in which they are allowed to gradually cool.

In ovens of the character described, as previously constructed, two chambers alone have been used—one for heating the glass, and a second one for cooling it—the several flatting-stones upon the revolving table, with the exception of the one that is in the heating-chamber, being located within the cooling-chamber. Such cooling-chamber is necessarily provided with an opening through which tools are introduced for the purpose of lifting the cooled sheets of glass from the flatting-stones and placing them upon the cars of the leer; and such chamber is therefore liable to receive an occasional or constant inflow of cold air through the said opening, by means of which a too sudden cooling and consequent injury to the sheets of glass therein may result, the sheets of glass which have just left the heating-chamber being obviously more liable to injury from this source than the others. In order to prevent injury to the glass from the cause above mentioned, the oven illustrated as embodying my invention is provided with a closed chamber located over the revolving table or wheel above mentioned and between the heating and cooling chambers, the partition-walls which divide said chamber from the heating and cooling chamber coming close to the surface of the revolving table, so that the contact of cold air with the glass when it is within said chamber is prevented. As an additional means of preventing the too rapid cooling of the glass, the portion of the cooling-chamber adjacent to the chamber last mentioned is constructed with an arched roof having its under surface close to the surface of the table, so that the heated air is retained in contact with the glass, and an influx of cold air to the glass when it first enters the cooling-chamber is prevented. The oven shown also embraces an improved construction in devices for turning the cars, so as to bring them into proper position for the placing of glass thereon when removed from the flatting-stones, and in the construction of the oven itself, by which the several chambers above mentioned are formed, as will be hereinafter more particularly described.

Figure 2:
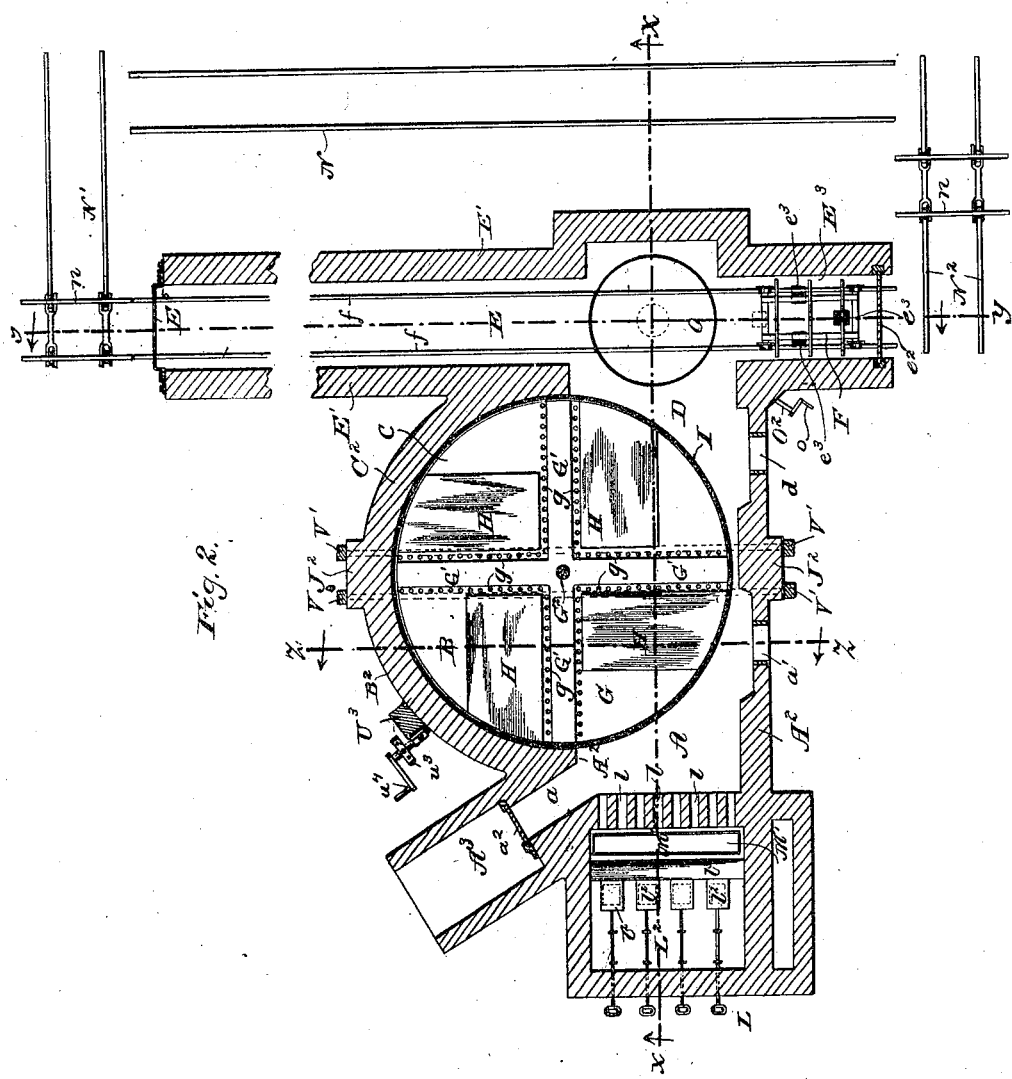
Figure 3:
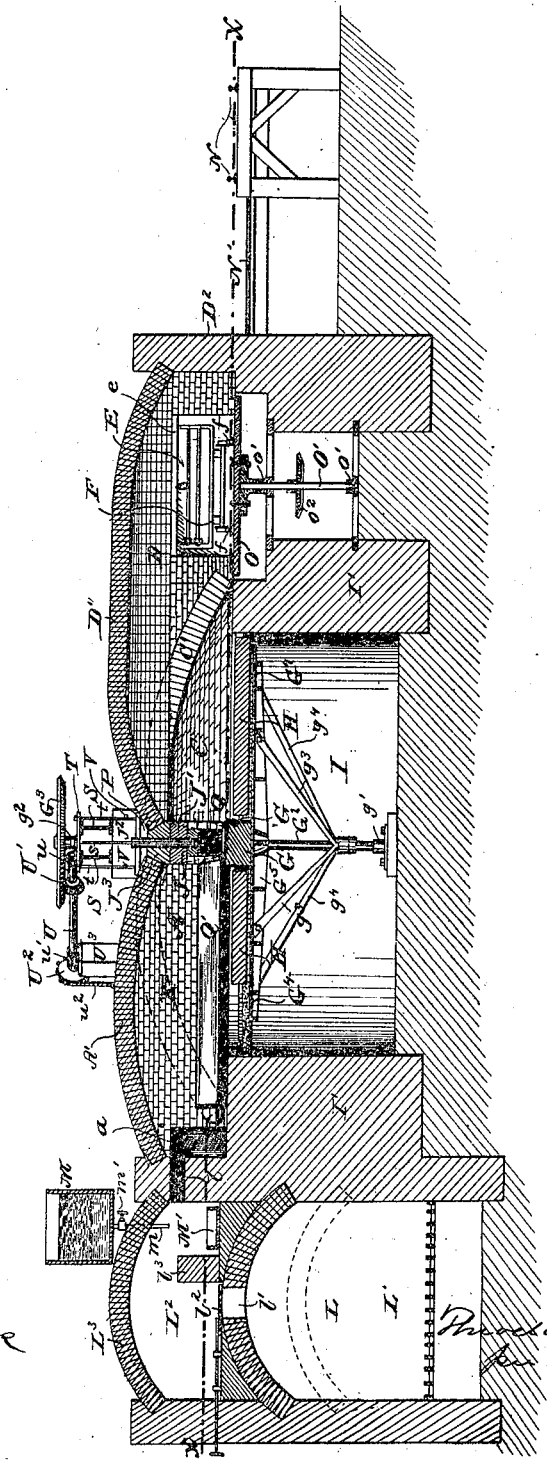
Figure 4:
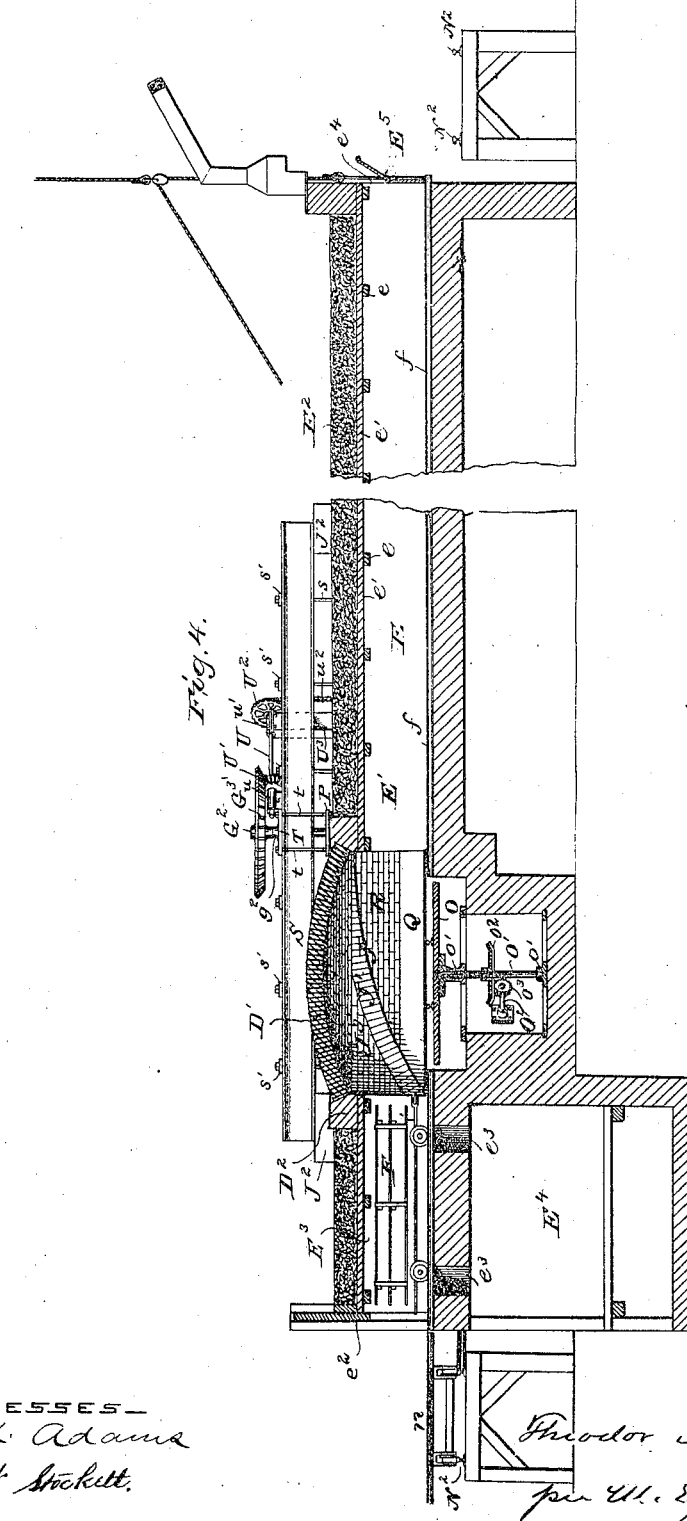
Figure 5:
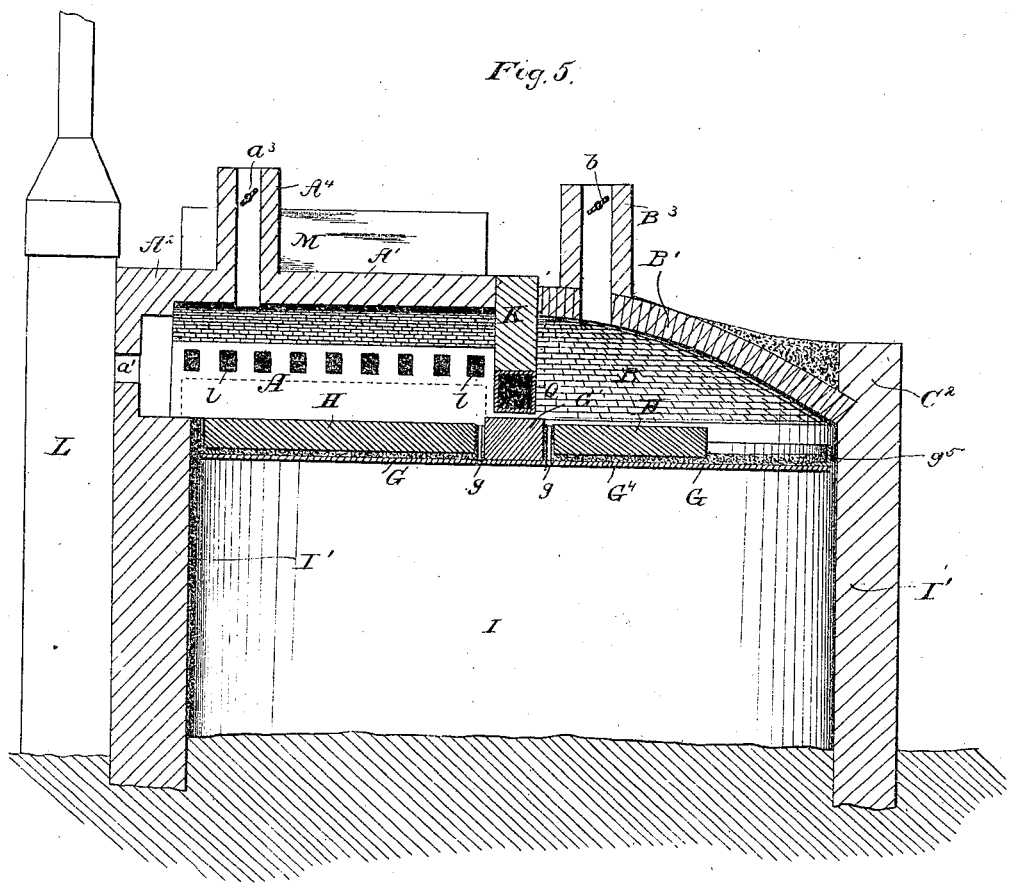

In the accompanying drawings, Figure 1 is a top plan view of a flatting-oven embodying my invention. Fig. 2 is a horizontal section taken upon line $x\,x$ of Fig. 3. Fig. 3 is a vertical section taken upon line $x\,x$ of Fig. 2. Fig. 4 is a vertical section taken upon line $y\,y$ of Fig. 2. Fig. 5 is a vertical section taken upon line $z\,z$ of Fig. 2. Fig. 6 is a section on line $x\,x$ of Fig. 1. Fig. 7 is a fragmentary detail view, from beneath, of the revolving table for supporting the flatting-stones. Fig. 8 is a detail view, hereinafter referred to.

As shown in the accompanying drawings, A is the heating-chamber of the flatting-oven. B, C, and D are cooling-chambers. E is the leer or annealing-oven, which is provided with track-rails $f$ for cars F, and L is a gas-generator, which is located in position adjacent to the heating-oven, and is connected therewith by passages $l$, through which gas is delivered thereto. G is a revolving wheel or table, which is constructed to support a series of flatting-stones, H, and is arranged centrally beneath the heating-chamber A and the cooling-chambers B, C, and D, and forms the bottoms or floor of said chambers. The table G is supported upon a central vertical shaft, $G^2$, located at the intersecting point of the partition-walls between the several chambers, said walls being arranged radially with reference to the shaft, and extending over the upper surface of the table, which is preferably located within a circular chamber, I, the upper surface of the side walls, I', of said chamber terminating at the level of said table, and forming portions of the floors of the chambers A and D. As preferably constructed, four flatting-stones, H, are located upon the table G at equal distances apart around the periphery thereof, and the chambers A and B extend over one-half of the circumference of the said table, and are separated from the chambers C and D by means of a straight central partition-wall, J, such wall being supported by means of suitable girders, as hereinafter described, and terminating a short distance above the surface of the flatting-stones, and the chambers A and B being separated by a partition, K, located at right angles to the wall J. The chambers C and D open one into the other, and together cover one-half of the table G, the chamber C having a low roof, C', intended to confine the heated air closely over the surface of a plate of glass which is upon a flatting-stone therein, and the chamber D being arranged to extend over the passage of the leer, and being constructed to afford space for the turning of the cars F, upon which the glass is held when within the leer, and for the operation of lifting the glass from the flatting-stones and placing them upon the cars. By the construction above described it will be seen that the chambers A and B each cover one-quarter of the table G, so that when one of the flatting-stones H is in the heating-chamber an adjacent one will be in the chamber B, and the two remaining stones upon said table will be respectively in the chambers C and D.

In the operation of the furnace constructed as described, the table G is turned in such direction that the flatting-stones pass from the heating-chamber A to the chamber B, such movement taking place periodically, and only as fast as the glass cylinders placed upon the flatting-stones in the heating-chamber are softened and flattened out by the operator, so that the sheet within the chamber B remains there some time, and sufficiently long to lose a considerable portion of its heat. The walls J and K, forming two sides of the chamber B, are extended downwardly to a point near the surface of the revolving table, so that there is practically no external air admitted to such chamber, and the glass while within said chamber will be subjected to no sudden changes in temperature.

As preferably constructed, low walls G' are formed radially upon the table G between the flatting-stones H, and extending above said stones a sufficient height to come nearly in contact with the lower surface of the beams supporting the walls K and J, such walls G' being arranged to divide the tables into quadrants to coincide with the walls J and K when the stones are in position in the several chambers, and thereby effectually separate the said chambers.

The heating-chamber A is preferably rectangular in plan, as shown more clearly in Fig. 2, and the revolving table G forms a portion only of its bottom surface or floor, the remaining portion of such floor being on a level with said table, and with the bottom of an inlet-passage, $a$, in the rear wall $A^2$ of the chamber, through which passage the glass cylinders are introduced into said chamber preparatory to flattening them, said cylinders resting upon the stationary portion of the floor of said chamber until placed upon the flatting-stones by means of a tool introduced through an opening, $a'$, in the front wall $A^2$ of the chamber. The passage $a$, for the introduction of the cylinders, is provided with a sliding door, $a^2$, constructed to be lifted when it is desired to place a cylinder in the chamber; and a hood or open chamber, $A^3$, of masonry is preferably built around the opening of said passage, the lower surface of which is upon a level with the floor of the passage and the chamber A, and in which the cylinders are preferably placed so as to be heated, preparatory to being placed in the chamber, by heat from the adjacent heated walls of the oven, and by the warm air escaping through the door $a^2$ when it is opened. The chamber A is, as shown, provided with a flue, $A'$, in its top, for the exit of surplus heat and products of combustion, said flue being provided with a damper, $a^3$, by which the escape of heated air and gases through the flue may be regulated.

The arched roof B' of the chamber B is preferably constructed to spring from the curved supporting-wall $B^2$ thereof at a line upon a level with the top of the table G, and curves upwardly over the said table, and intersects the walls J and K upon curved lines, as shown in Fig. 5, and in dotted lines in Fig. 3, the arch being only slightly curved, so as to leave comparatively little space over the said table, and to confine the heated air closely to the surface thereof. The chamber B is provided with an exit-flue, $B^3$, as shown in Figs. 1 and 5, said flue being located at the upper part of the arched roof of said chamber, and being provided with a damper, $b$, whereby the temperature in the said chamber may be controlled by allowing the escape of more or less of the heated air therefrom. The roof of the chamber C is arched in a manner similar to that of the chamber B, so as to confine the heated air closely to the surface of the flatting-stones, and to prevent the influx of sudden drafts of cold air from the chamber D, of which it forms a part. The cooling of the glass in said chamber C is facilitated, however, by the escape of hot air therefrom into the said chamber D, the roof of which, as shown more clearly in Fig. 3, is higher than that of said chamber C.

As far as the operation of the revolving table, in connection with the several chambers above described, is concerned, the cylinders within the heating-chamber may be heated in any desired or preferred manner; but in order to provide a convenient means for supplying gas for this purpose the gas-generator L is located in position adjacent to the said heating-chamber, and the gas produced thereby is introduced into said chamber through the series of openings $l$, formed in the partition-wall between said heating-chamber and generator. The gas-generator shown is of that class known as a "Siemens" generator, and has a chamber, L', provided with a grate, upon which the coal is burned, and a receiving-chamber, $L^2$, located above said chamber L', and communicating therewith by means of a series of openings, $l'$, provided with valves $l^2$. The chamber $L^2$ is, as shown, provided with a partition-wall, $l^3$, between the apertures $l'$ and the passages $l$.

As a preferable means of introducing steam into the gas produced in the generator previous to its passage into the heating-chamber, for the purpose before referred to, a tank, M, is located above the top or covering $L^3$ of the receiving-chamber $L^2$, said tank being connected with a pipe, $m$, which extends through the top of said chamber, and is provided with a valve, $m'$, by which the flow of water from said tank through the pipe may be regulated. A metal pan or trough, M', is preferably placed within the chamber $L^2$, beneath the end of the pipe $m$, upon which the water passing through said pipe falls, the water preferably being fed in small quantities, so that it is vaporized as rapidly as it enters the chamber. The heat within the chamber is such that the steam produced from the water is superheated or converted into a gaseous form, and, becoming mixed with the gas produced from the coal, enters the heating-chamber and is burned with such gas. A sufficient supply of air to cause ignition of the gas passing to the heating-chamber A from the generator is permitted to enter the said chamber from beneath the table G, a portion of such air entering through the space between the margins of said table and the floor of the chamber, and a portion through a series of holes, $g$, which are preferably formed in said table around two sides of the flatting-stones H, so that a supply of air is given upon all sides of said flatting-stones, and combustion is caused to take place evenly over the entire surface of the sheets of glass upon said stones.

The leer or annealing-oven E consists, as before described, of a passage of considerable length, which intersects the chamber D, the track-rails $f$ in the passage of the leer passing through said chamber and near the table G, so that the sheets of glass may be readily removed from the flatting-stones to the cars F. A number of said cars are used, although but one is shown in the drawings, the cars being placed one after another in the leer and in contact with each other, so as to fill the passage from end to end, a car loaded with cooled glass being removed at the extreme end of the leer at the time that another is introduced into it from the chamber D. Said cars F, after passing from the end of the leer remote from the furnace, are returned to a position adjacent to the chamber D by means of a track, N, and two cross-tracks, N' and N², which are provided with shifting-cars $n$, by which the cars F, for holding the glass, may be placed upon such return-track at the remote end of the leer, and returned to the leer at its end adjacent to the furnace.

A passage, E³, preferably forming an extension of the passage of the leer, and having a door, $e^2$, is provided for the introduction of the cars returned by the track N into the chamber D preparatory to reloading them with sheets of glass. The said passage E³ is made of sufficient length to contain a car, and has beneath it a furnace, E⁴, which communicates therewith by passages $e^3$, through which hot air from said furnace may enter said passage, for the purpose of heating the car previous to placing the sheets of glass thereon, such heating being necessary in order to prevent the glass becoming cracked by contact with the cars after they have become cooled in their passage outside of the leer. These devices are well known in the art, and form no part of this invention.

The flatting-stones H are preferably made longer in one direction than in the other, and one of their longer sides is placed upon a radial line of the table G, so that the longer sides of the adjacent stones are at right angles to each other. The flatting-stones are so arranged that when within the heating-chamber their shorter sides will be toward the opening thereof, for convenience of the operator in manipulating the cylinders; and the stone in the cooling-chamber which is adjacent to the one in the heating-chamber is thus located at right angles to the one last mentioned, and with its side toward the openings $d$ in the chamber D, through which implements are introduced for the purpose of removing the sheets of glass from said stones and placing them upon the cars F. The passage of the leer is preferably located at right angles to the front walls of the furnace, in order to permit the insertion of the cars at one end and the exit of said cars at the other, and is necessarily adjacent to the flatting-stones from which the cooled sheet of glass is to be removed, so that the track-rails therein pass at one side of the table G and across one of the shorter sides of the flatting-stones. When the leer and the flatting-stones are arranged as described, it is obviously necessary to turn the sheets of glass around in removing them from the stones to the cars, in order to place them lengthwise on said cars, and so as to permit them to pass lengthwise through the leer.

In order to obviate the necessity for turning the glass sheets, as described, and to enable the leer to be located at any angle desired with reference to the chamber D, a turn-table, O, is located in line with the track-rails $f$ and adjacent to the end of the flatting-stone which is within the chamber D, said turn-table being preferably controlled by means of a crank-shaft, O², extending through the outer wall of the furnace, and provided with a crank, $o$. By means of this turn-table the track-rails may enter the chamber D at any angle desired, and the cars may be placed upon said turn-table and turned in position for the transfer of the sheets of glass thereto, with its longer sides parallel with the rails, and then rotated, so that the glass will pass lengthwise through the leer. As preferably constructed, Fig. 3, the turn-table O is mounted upon a vertical shaft, O', which is supported in bearings $o'$, secured in the brick-work of the furnace, and is provided with a beveled gear-wheel, $o^2$, which meshes with a second gear-wheel, $o^3$, upon the shaft O². A suitable temperature is retained in the leer or annealing-oven for the purpose of allowing a gradual cooling of the glass by means of the heat of the glass itself and hot air from the chamber D, which passes through the passage of the leer and makes its exit therefrom at an opening, $e^4$, formed in a sliding door, E⁵, by which the exit end of the leer is closed.

In leers or annealing-ovens, as heretofore constructed the roof thereof has usually consisted either of a series of arches resting upon transverse beams, or of a continuous arch supported by the side walls of the leer. The latter construction is the one most commonly used, and when it is employed depending partition-walls are usually placed transversely in the arched portion of the passage of the leer, above the path of the cars, for the purpose of directing the heated air passing through the leer downwardly upon the glass, so as to prevent the latter from cooling too rapidly, and valved exit-flues are in such case also usually placed in the arched roof between the partitions mentioned, in order to permit the escape of surplus heat, and to enable the temperature in different parts of the leer to be regulated. The construction first mentioned, in which the roof of the leer is formed of a series of transverse arches, has the disadvantage of throwing the heated air downwardly upon the glass and allowing it to rise therefrom at intervals in its passage through the leer; and the second form of construction referred to presents the same disadvantage, with the added ones of an expensive construction in the partitions, exit-flues, and regulating-valves for the latter. In order, therefore, to provide a simple and cheap means of constructing the roof of the leer, and one whereby the objectionable features thereinabove mentioned are avoided, the under or inner surface of the roof of the leer herein shown is made flat, and space only is left between the said flat roof and the floor of the leer for the passage of the cars supporting the glass. By this construction all of the heated air in the leer is retained constantly in contact with the sheets of glass upon the cars, and the same relative temperature is maintained in the different parts of the leer, whereby the glass will be cooled equally in its different parts, and liability of the sheets of glass becoming warped or cracked by unequal cooling is much lessened. As a simple and cheap means of constructing the flat roof described, it is composed of transverse metal bars $e$, supported upon the side walls, E', of the leer, and metal plates $e'$, placed upon said bars, the whole being covered by a layer, $E^2$, of loam or sand, in order to equalize the temperature within the leer, and to prevent the too rapid escape of heat therefrom.

In flatting-ovens having a rotating table and a heating and a cooling chamber located above said table, as heretofore constructed, a difficulty has been found in supporting the dividing-wall between such chambers, on account of the liability of the metal girders used for this purpose to injury from the heat in the oven, such heat causing the rapid deterioration of the iron, and the consequent necessity of frequent removal and replacing of the beams. An improved construction in such partition-walls, by which the above-mentioned difficulties are obviated, is illustrated in the drawings and shown more clearly in Fig. 6 thereof, and is as follows: Between two oppositely-arranged abutments or piers, $J^2$, which form part of the main wall of the furnace, as shown more plainly in Fig. 2, and centrally over the table G, is formed an arch, J', having the horizontal width equal to the thickness of the said wall. At the center of said arch, and surrounding the upper portion of the vertical shaft $G^2$, upon which the revolving table G is supported, is placed a hollow casting or drum, P, such drum being preferably rectangular in horizontal section, and having inclined surfaces at its upper portion, against which rest the voussoirs or arch-stones adjacent to the center of the arch, so that such drum or casting P forms in fact the keystone of the arch. The said drum preferably extends downwardly to a point opposite the spring-line of the arch, and is provided with a horizontally-projecting flange, $p$, at its lower end, constructed to support the inner ends of two hollow girders or mantels, Q, the outer ends of which rest in the piers $J^2$ at the spring-line of the arches, and which serve to support a filling or wall, R, of brick or other substance in the space between the said mantels and the under side of the arch. The portion of the arch adjacent to the piers $J^2$ is surmounted by a filling, $J^3$, which serves to complete the partition-wall to a level with the top of the arch. By this construction the entire weight of the partition-wall may be carried by the arch J', the mantels Q only serving to support the comparatively small weight of the filling R between the upper surface of said mantels and the under surface of the arch beneath one-half of said arch. A very small strain, therefore, comes upon the said mantels; and in case of their being injured by heat, they may be removed without affecting any part of the partition, except the filling R, and new mantels substituted. The drum P, being located at the intersection of the several walls, is less exposed to the influence of heat than the mantels; and as an additional protection, such drum is usually surrounded by a layer of fire-brick in its exposed portion, as shown in Fig. 3. The central aperture in the drum P, through which the shaft $G^2$ passes, is preferably made of cylindrical form, and larger than the said shaft; and said drum is provided at its lower end with openings $p'$, which communicate with the hollow interiors of the mantels Q, which are supported thereby. The interior of said mantels, at the outer ends thereof, communicate with openings $q$ in the piers $J^2$, said openings extending to the outside of the oven, and permitting an inward draft of air through the said mantels and upwardly through the drum P around the shaft $G^2$, this air-current having the effect of cooling the said mantels, and preventing the overheating of the shaft $G^2$ in its portion which passes through the drum.

As shown in the drawings, the mantels Q are additionally supported in their portions intermediate to their ends by means of girders S, which are located above the oven and rest at their ends upon the piers $J^2$, and are connected with the said mantels by means of suspension-rods $s$, which are secured in cross-pieces $s'$, resting at their ends upon the tops of the girders S, and are inserted at their lower ends in apertures in the top of the mantels Q, nuts $s^2$ being placed upon such lower ends in the interior of the mantels, as shown. The rods $s$ are preferably surrounded in the portions thereof which pass through the walls J with tubes or tiles $s^3$, which are open at their tops and communicate at their lower ends with suitable openings, $q'$, formed in the mantels Q, thus permitting an upward flow of air from said mantels around the said rods, which tends to keep them cool and prevents injury thereto from the heat of the wall. As preferably constructed, the apertures $q'$ in the mantels Q, as shown in the detail view, Fig. 8, are provided upon one side with narrow extensions or slots $q^2$, in which the lower ends of the rods are placed, said rods being connected with the mantels in putting up the oven by inserting the heads or nuts $s^2$ through the apertures $q'$, and then slipping the rods laterally into the slots $q^2$. The drum P also serves to support the inner end of a mantel, Q', similar to the mantels Q, which serve as support to the partition-wall K between the chambers A and B, the outer ends of said mantel being supported by the side wall of the furnace, and communicating with an aperture therein, by which air may pass through said mantel and the drum P, in the manner above described in connection with the mantels Q.

The upper portion of the partition-wall J is, as shown, inclined at its sides to form the skewbacks or abutting-faces against which the inner portions of the arched coverings of the several chambers rest, the thrust of the arch A' acting against that of the arch D' upon said wall at the front portion of the oven, and the arch B' opposing the arch C' at the rear portion thereof. It will be observed from the construction described that the weight of a considerable portion of the arched roofs of the several chambers is carried by the partition J. It is important, therefore, that such partition should be both exceedingly rigid, and that its supports should be so constructed that the portions thereof which are liable to be affected by heat may be removed and replaced without the necessity of destroying the principal part of the oven. These results are both obtained by the construction in the said partition-wall above set forth, the arch J giving it great rigidity, and at the same time permitting the removal of the beams or mantels Q without affecting any part of the structure except the filling R immediately above them.

The shaft G², by which the table G is supported, is, as shown, supported at its lower end in a bearing, g', placed upon a suitable support upon the ground at the bottom of the chamber I, and at its upper end has bearing at g² in a plate, T, which rests upon and is secured to the girders S, before mentioned. Upon the upper end of said shaft, above the plate T, is secured a gear-wheel, G³, which meshes with a gear-wheel, U', upon a shaft, U, which is located horizontally over the oven, and is supported at one end in a bearing-box, u, upon one of the girders S, and at its opposite end in a bearing-box, u', which is mounted upon the upper end of a post, U³, at the outer wall of the oven, the said shaft having secured upon its outer end a sprocket-wheel, U², over which a chain belt, u², is placed, by which motion is transmitted to said shaft from a sprocket-wheel, u³, mounted near the lower end of the post, and operated by a hand-crank, u⁴, or otherwise.

For the purpose of giving additional support to the drum P, the plate T is connected therewith by means of vertical suspension-rods t, which are secured in said plate at their upper ends, and pass at their lower ends through a horizontal flange, p², at the upper end of said drum.

As a preferable construction in the table G, it consists of a circular sheet-metal plate, G⁴, which rests upon a series of segmental cast-iron gratings, G⁵, which are secured to the shaft G², and supported at their outer portions by means of inclined braces g³ and g⁴ from said shaft, said plate being strengthened around its edges by means of an angle-iron, g⁵, and the flatting-stones being held in position upon said table by being set in clay or plaster. As shown in the drawings, Fig. 7, the segments G⁵ consist of a series of radial and cross ribs, and six of such segments are used, which are bolted together and fitted at their inner margins to a hexagonal enlargement upon the shaft G²; the braces g⁴ being connected to said segments, near the periphery of the table, by bolts passing through the adjacent radial ribs of two adjoining segments, and the shorter segments g³ being connected with the central portions of the several segments.

The piers J², which form the abutments against which the ends of the arch J' rest, may be built of sufficient strength to withstand the end-thrust of said arch; but as shown in the drawings, and as preferably constructed, the upper ends of said piers are connected by means of tie-rods V, which are attached at their ends to the upper ends of rigid vertical bars V', placed against the outer vertical faces of the said piers, and the lower ends of which bars may either be inserted in the ground a sufficient distance to hold them securely in place, or connected by tie-rods similar to those above described.

I claim as my invention—

1. The combination, with the heating-chamber of a flatting-oven, and with a gas-generator communicating therewith, of means for introducing steam into the gas before the admission of the gas into the heating-chamber, substantially as described.

2. The combination, with the heating-chamber of a flatting-furnace, a gas-generator, and passages connecting the generator with the heating-chamber, of means for introducing water into the generator, whereby steam is mixed with the gas previous to its introduction into the heating-chamber, substantially as described.

3. The combination, with the heating-chamber of a flatting-oven, of a gas-generator located adjacent thereto, and provided with a gas-chamber, L², passages connecting the gas-chamber with the heating-chamber, a water-tank, and a valved pipe connecting said tank with the said gas-chamber, substantially as and for the purposes set forth.

4. The combination, with the heating-chamber of a flatting-oven, of a gas-generator provided with a chamber, L², a water-reservoir provided with a pipe extending through the upper wall of said chamber L², and a receptacle, M', located within the chamber beneath the exit-opening of said pipe, substantially as and for the purpose set forth.

5. The combination, with the heating-chamber of a flatting-oven, a gas-generator, and passages connecting the generator with the heating-chamber, of a revolving wheel or table constructed to support a series of flatting-stones, and forming the bottom of the chamber, said table being provided with apertures g, for the admission of air to said chamber, substantially as described.

6. The combination, with the heating-chamber of a flatting-oven, a cooling-chamber located adjacent thereto, and a revolving wheel or table constructed to support a series of flatting-stones, and forming the bottoms of said chambers, of a closed chamber located over the said table between the chambers above mentioned, substantially as and for the purpose set forth.

7. The combination, with the heating and cooling chambers of a flatting-oven, and a revolving table forming the bottoms of the said chambers, and constructed to support a series of flatting-stones, of a closed chamber located over the said table between the chambers mentioned, and provided with a flue or passage having a suitable damper, whereby the temperature in said chamber may be regulated, substantially as described.

8. The combination, with the heating-chamber A of a flatting-oven, a leer or annealing-oven, a cooling-chamber, D, communicating with the leer, a closed chamber, B, and a revolving table, G, constructed to support a series of flatting-stones, and forming the bottoms of the several chambers mentioned, of a chamber, C, located between the chambers B and D and opening into the latter, said chamber C having a low roof constructed to confine the heat to the surface of said stones, and to prevent the too rapid cooling of the glass thereon, substantially as described.

9. The combination, with the heating-chamber of a flatting-oven, a leer or annealing-oven provided with track-rails, a car for supporting the glass within the leer, a cooling-chamber, D, communicating with the leer, and a rotating wheel or table constructed to support a series of flatting-stones, and forming the bottoms of the chambers mentioned, of a turn-table located within the chamber D, adjacent to the flatting-stones, and constructed to receive the car, whereby said car may be turned to a desired position for placing the sheets of glass thereon, substantially as described.

10. The combination of the heating-chamber of a flatting-oven, a leer, a cooling-chamber, D, communicating with the leer, a revolving table constructed to support a series of flatting-stones, and forming the floor of the said heating-chamber and of the chamber D, a car, tracks arranged longitudinally within the leer for supporting the car, a turn-table within the chamber D, and means for rotating said turn-table from the exterior of the oven, substantially as described.

11. The combination, with a flatting-oven, of an annealing-oven or leer communicating with said flatting-oven, and cars for supporting the sheets of glass within the leer, the said leer being constructed with a roof which is flat upon its under side, whereby the heated air within the leer is retained in proximity to the sheets of glass upon the cars, substantially as described.

12. The combination, with the walls of a flatting-oven having two or more chambers, and a revolving table or wheel constructed to support a series of flatting-stones within the oven, of a supporting-arch, J', located between the said walls and over said table, a metal casting, P, forming the keystone of the arch, horizontal beams or mantels resting at their outer ends on the side walls of the oven and supported at their inner ends by said casting, and a suitable roof or covering supported upon the outer walls of the oven and upon the said arch, and constructed to form the chambers of the oven, substantially as described.

13. The combination, with the side walls of a flatting-oven, and the revolving table G, for supporting a series of flatting-stones, and a shaft, $G^2$, constructed to support said table, of an arch, J', located between the side walls of the oven and over the said table, a casting, P, forming the keystone of the arch, and constructed to afford passage for the vertical shaft $G^2$, horizontal beams or mantels Q, supported at their outer and inner ends by the side walls and the casting P, respectively, and a filling, R, between the arch and the said beams, substantially as described.

14. The combination, with the side walls of a flatting-oven, and a revolving wheel or table, G, of a casting, P, means constructed to support said casting from the walls of the oven, horizontal beams or mantels Q, supported at their outer ends by the said walls and at their inner ends by the casting P, girders S, located over the top of the furnace and supported upon the side walls thereof, and rods s, constructed to support the said mantels from the girders intermediately of their ends, substantially as described.

15. The combination, with the side walls of a flatting-oven, and a revolving wheel or table, G, of an arch, J', a casting, P, forming the keystone of the arch, horizontal beams or mantels Q, supported at their inner ends by the said casting, girders S, located over the furnace and supported upon the side walls thereof, rods s, connecting said mantels and girders, and rods t, connecting the girders with the casting P, substantially as described.

16. The combination, with the side walls and revolving table of a flatting-furnace, of hollow beams or mantels Q, for supporting the partitions over said wheel, and passages connecting the hollow interior of said mantels with the outer air, substantially as described.

17. The combination, with the outer walls and revolving table of a flatting-oven, of a drum, P, located centrally over said table, means constructed to support said drum from the side walls of the furnace, hollow mantels Q, supported at their outer ends by the side walls of the furnace and at their inner ends by said drum, and passages connecting the hollow interior of said mantels at their outer ends with the open air, and at their inner ends with the interior of the drum, substantially as and for the purpose set forth.

18. The combination, with the outer wall and revolving table of a flatting-oven, a hollow mantel, Q, supported at its outer end by the said wall, means for supporting the inner end of the mantel, girders S, and rods s, connected with said mantel and girders, of a partition-wall located above said mantel, and provided with passages surrounding said rods, and communicating with the interior of the mantel and with the open air, substantially as and for the purpose set forth.

19. The combination, with the outer walls and revolving table of a flatting-furnace, and the partition-wall J, of the hollow mantels Q, girders S, supported by the outer walls of the furnace, rods s, connected with said girders and mantels, and tubes $s^3$, located within the partition-wall around the rods and communicating at their lower ends with the interior of the mantels, and passages connecting the ends of said mantels with the outer air, substantially as and for the purpose set forth.

20. The combination, with the partition-wall J, of mantels Q, provided with apertures $q'$, having slotted extensions $q^2$, supporting-rods s, having heads $s^2$, and vertical apertures in said wall communicating with said apertures $q'$ and surrounding the rods, substantially as and for the purpose set forth.

In testimony that I claim the foregoing as my invention I affix my signature in presence of two witnesses.

THEODOR A. ZELLERS.

Witnesses:
 CLARENCE GRIGGS,
 HENRY L. ROCHELLE.